(12) United States Patent
Li

(10) Patent No.: US 11,299,230 B1
(45) Date of Patent: Apr. 12, 2022

(54) FRONT FORK OFFSET ADJUSTMENT DEVICE

(71) Applicant: Mu-Rong Li, Taichung (TW)

(72) Inventor: Mu-Rong Li, Taichung (TW)

(73) Assignee: GREAT GO CYCLES INC., Taichung (TW)

( * ) Notice: Subject to any disclaimer, the term of this patent is extended or adjusted under 35 U.S.C. 154(b) by 78 days.

(21) Appl. No.: 17/031,846

(22) Filed: Sep. 24, 2020

(51) Int. Cl.
*B62K 21/02* (2006.01)
*B62K 25/02* (2006.01)

(52) U.S. Cl.
CPC ............. *B62K 21/02* (2013.01); *B62K 25/02* (2013.01)

(58) Field of Classification Search
CPC .................................. B62K 21/02; B62K 25/02
USPC .................................................. 280/277, 279
See application file for complete search history.

(56) References Cited

U.S. PATENT DOCUMENTS

| 2012/0228851 A1* | 9/2012 | Chen ...................... | B62K 25/02 280/287 |
| 2014/0049020 A1* | 2/2014 | Wendt .................... | B62K 25/02 280/274 |
| 2021/0187713 A1* | 6/2021 | Winefordner .............. | B62J 9/40 |

FOREIGN PATENT DOCUMENTS

CN          209336917 U   *   9/2019

* cited by examiner

*Primary Examiner* — Kevin Hurley
*Assistant Examiner* — Hosam Shabara

(57) ABSTRACT

A bicycle front fork adjustment device includes two legs and each leg includes a dropout which includes a first portion and a second portion. The second portion extends from the first portion in a direction away from the first portion. A room is formed in outside of each of the dropouts and located corresponding to the first and second portions. A first hole and a second hole are respectively defined through the inner bottom of the room, and respectively located corresponding to the first and second portions. The room forms an opening via which an adjustment member is adjustably located in the room. The adjustment member includes a passage which is located corresponding to the first or the second hole by adjusting the adjustment member between a first position and a second position in the room.

6 Claims, 13 Drawing Sheets

US 11,299,230 B1

FRONT FORK OFFSET ADJUSTMENT DEVICE

BACKGROUND OF THE INVENTION

1. Fields of the Invention

The present invention relates to a bicycle front fork, and more particularly, to a front fork offset adjustment device.

2. Descriptions of Related Art

Bicycle front forks play an important role for operation of a bicycle. For example, the value of trail affects the turning and straight movement of the bicycle. In order to have a desired value of trail, the users usually adjust the fork offset (rake). However, the steps for adjustment of the fork offset is complicated. Taiwanese Patent M585740 discloses a front fork offset adjustment wherein the angle that the dropouts adjust is fixed. Most of the users replace a new front fork to meet their needs. Although some users own multiple front forks, the cost for preparing the front forks will be not suitable for most users. It is also not a convenient way for the users to carry spare front forks with them.

The present invention intends to provide a front fork offset adjustment device which is easily operated and eliminates shortcomings mentioned above.

SUMMARY OF THE INVENTION

The present invention relates to a bicycle front fork adjustment device and comprises a front fork including a crown portion and two legs extending from the crown portion. Each leg includes a dropout which includes a first portion and a second portion, wherein the second portion extends from the first portion in a direction away from the first portion. A room is formed in the outside of each of the dropouts and located corresponding to the first and second portions. A first hole is defined through the inner bottom of the room and located corresponding to the first portion. A second hole is defined through the inner bottom of the room and located corresponding to the second portion. The room forms an opening which is located away from the inner bottom of the room. An adjustment member is adjustably located in the room of each leg. The adjustment member has a passage defined therethrough. The adjustment member is located at a first position in the room when the passage is located corresponding to the first hole. The adjustment member is located at a second position in the room when the passage is located corresponding to the second hole. The bicycle hub is connected to the passage and the first hole or the second hole to achieve the purpose of adjusting the fork offset.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
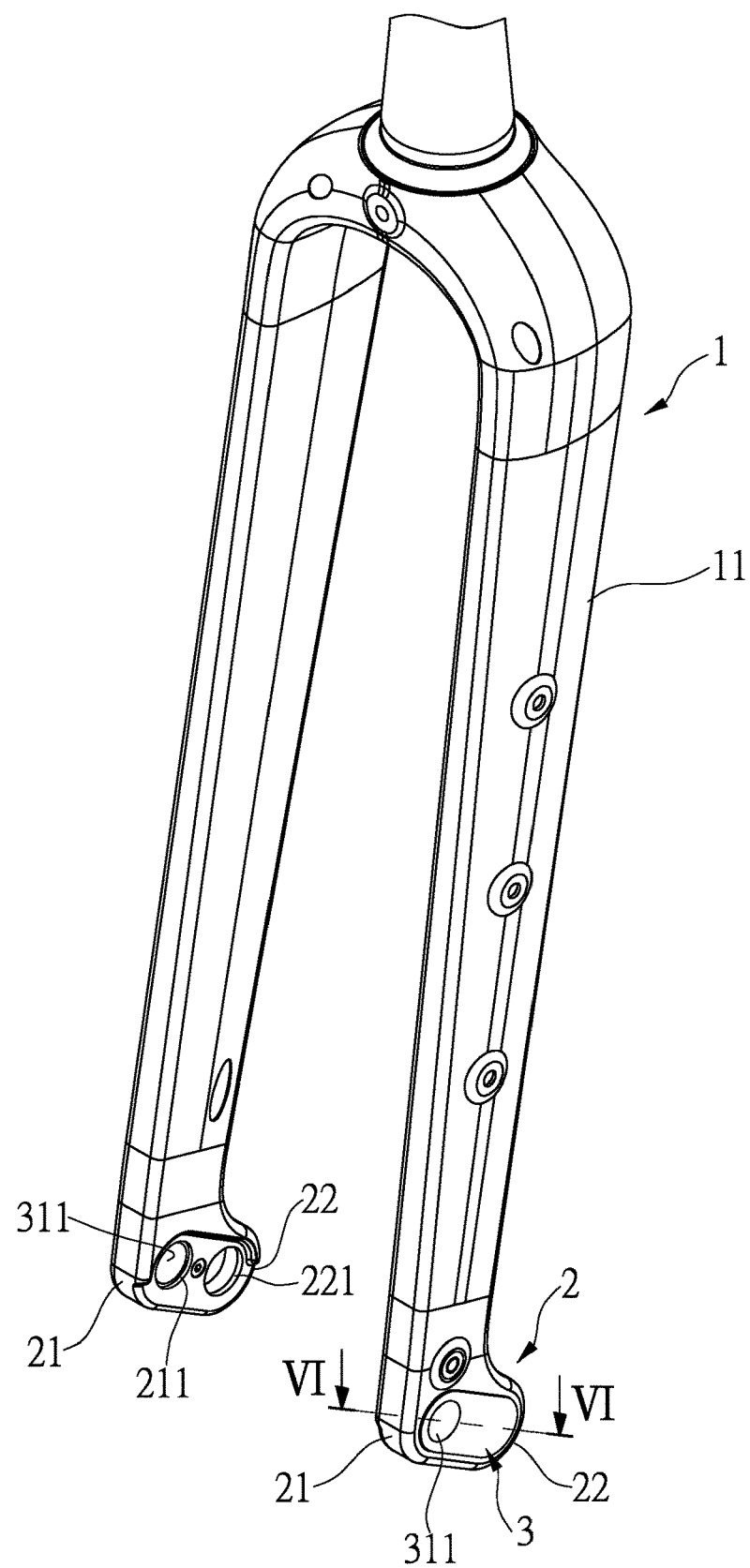
FIG. 1 is a perspective view to show the front fork offset adjustment device of the present invention.
Figure 2:
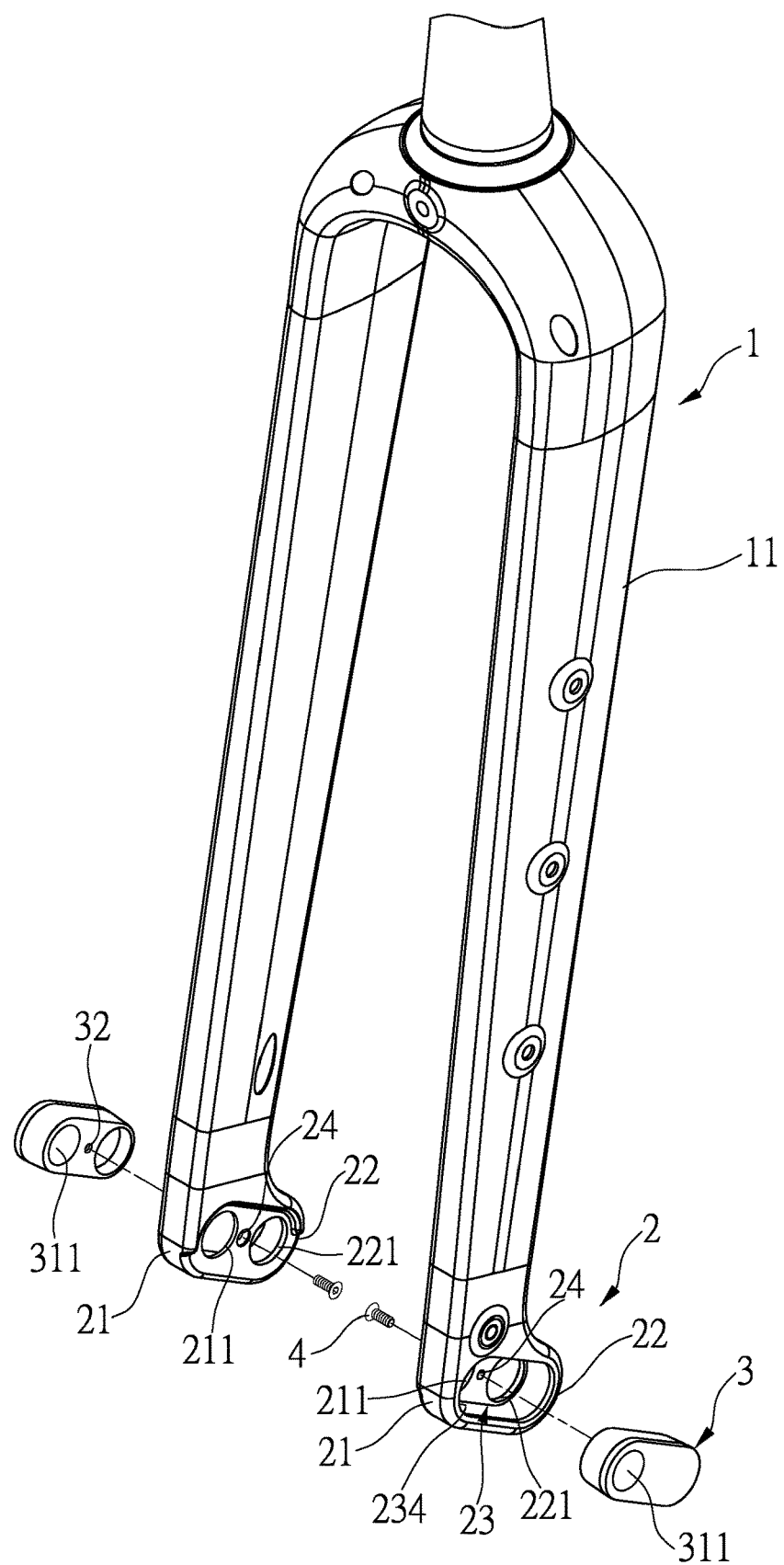
FIG. 2 is an exploded view of the front fork offset adjustment device of the present invention.
Figure 3:
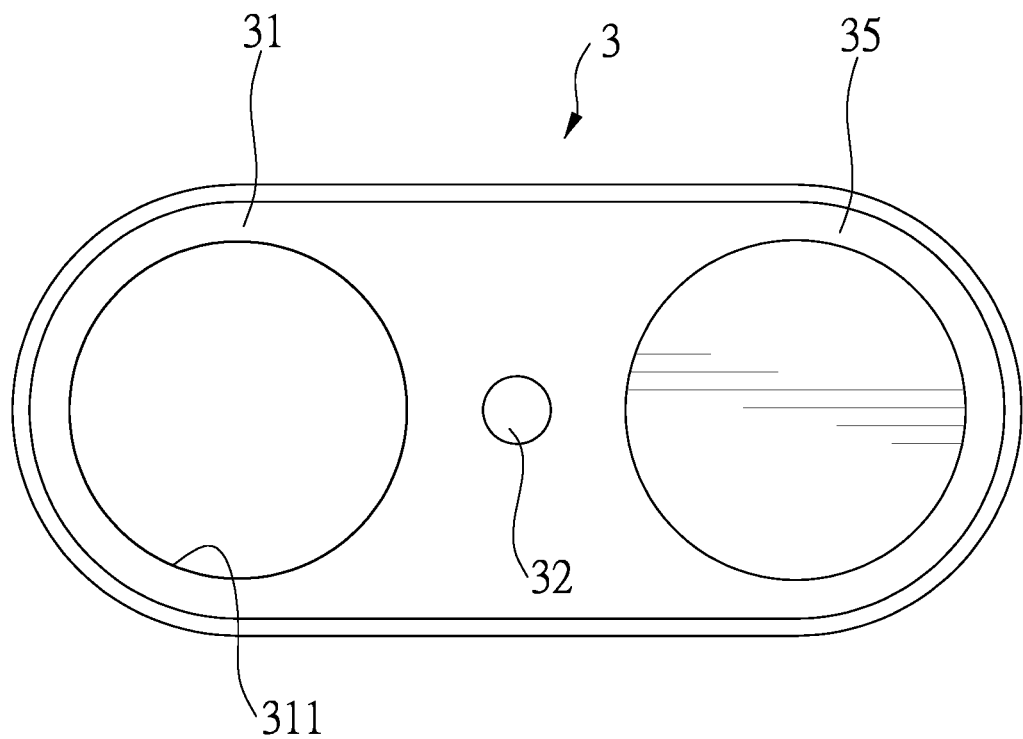
FIG. 3 is an end view of the adjustment member of the front fork offset adjustment device of the present invention.
Figure 4:
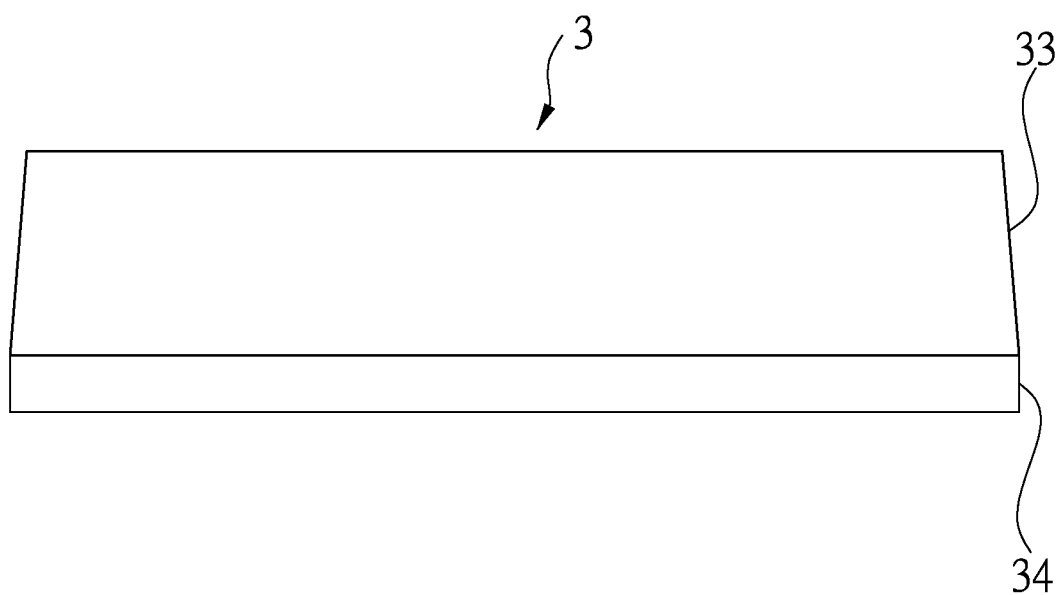
FIG. 4 is a side view of the adjustment member of the front fork offset adjustment device of the present invention.

Referring to FIGS. 1 to 11, the front fork offset adjustment device of the present invention comprises a front fork 1 including a crown portion and two legs 11 extending from the crown portion. Each leg 11 includes a dropout 2 which includes a first portion 21 and a second portion 22. The second portion 22 extends from the first portion 21 in a direction away from the first portion 21. A room 23 is formed in the outside of each of the dropouts 2 and located corresponding to the first and second portions 21, 22. A first hole 211 is defined through the inner bottom of the room 23 and located corresponding to the first portion 21. A second hole 221 is defined through the inner bottom of the room 23 and located corresponding to the second portion 22. The room 23 forms an opening 234 which is located away from the inner bottom of the room 23. An adjustment member 3 is adjustably located in the room 23 of each leg 11. The adjustment member 3 includes a passage 311 defined therethrough.

The adjustment member 3 is located at a first position (offset65) in the room 23 when the passage 311 is located corresponding to the first hole 211. Alternatively, the adjustment member 3 is located at a second position (offset44) in the room 23 when the passage 311 is located corresponding to the second hole 221. The axle of the hub of a front wheel 8 is engaged with the passage 311 and one of the first hole 211 or the second hole 221.

Figure 5:
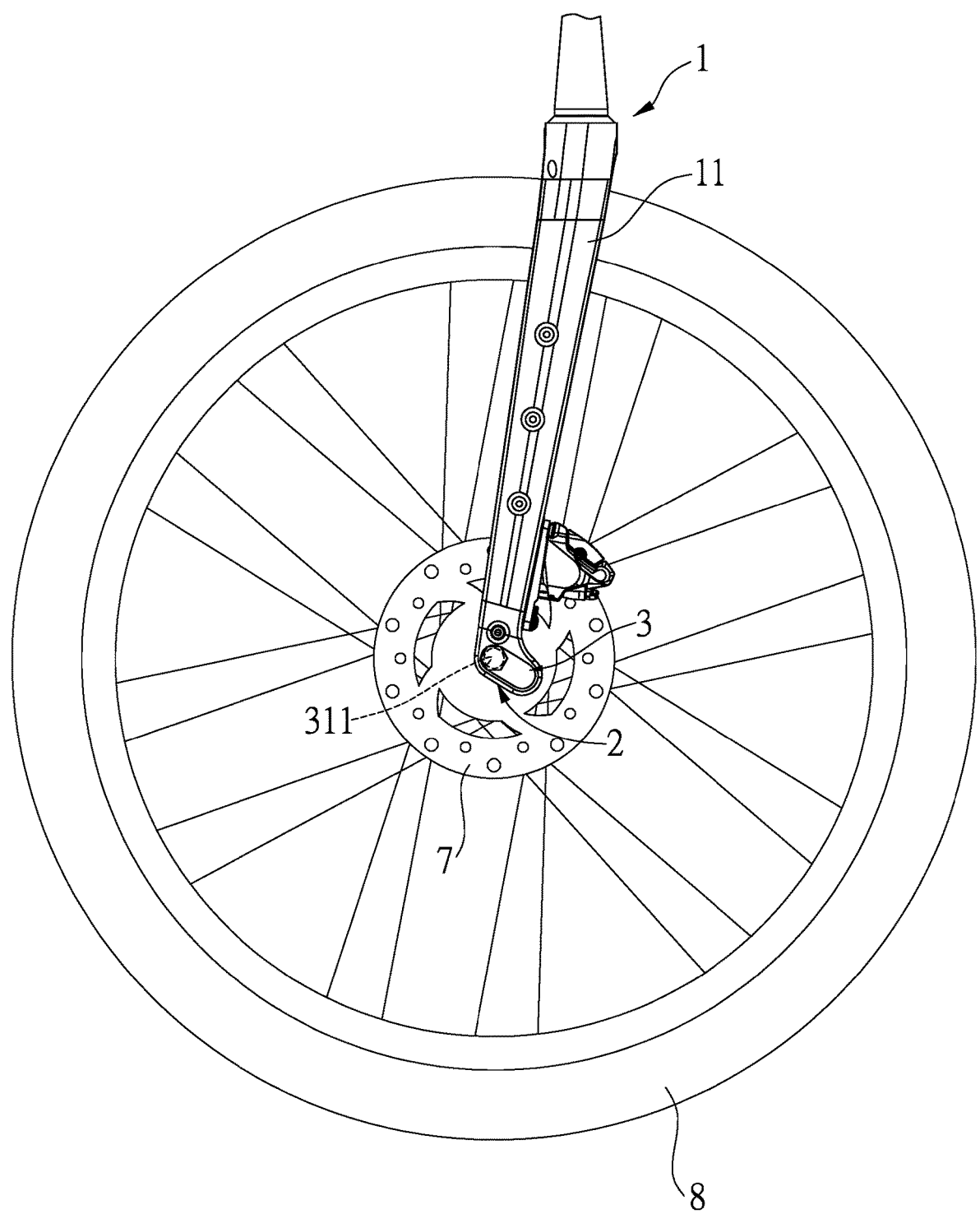
FIG. 5 shows that the front fork offset adjustment device of the present invention is cooperated with a wheel.
Figure 6:
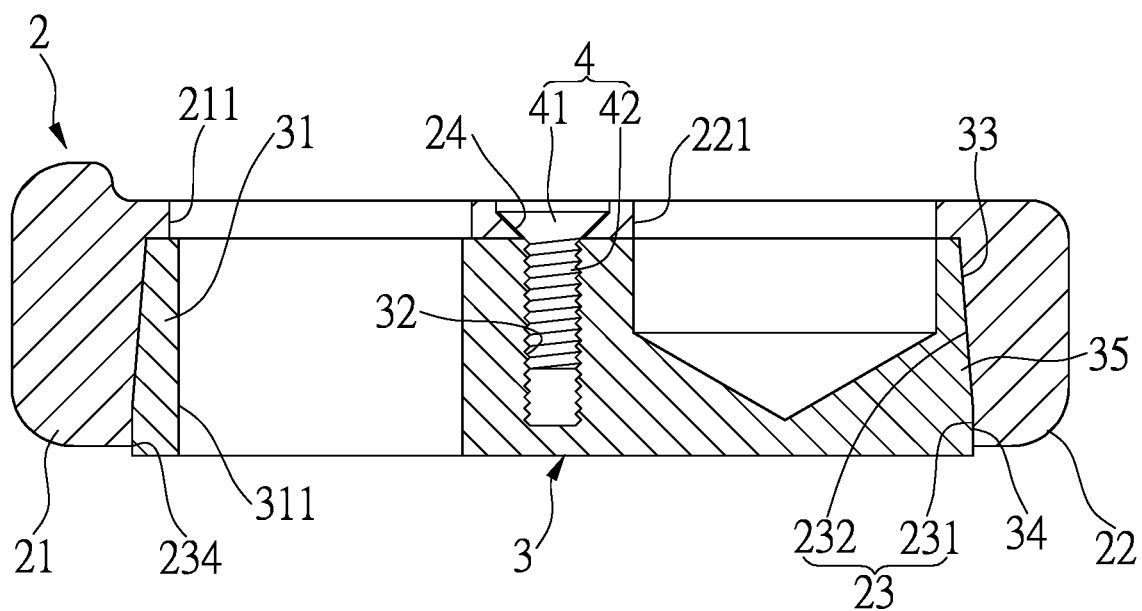
FIG. 6 is a cross sectional view, taken along line VI-VI in FIG. 1.
Figure 7:
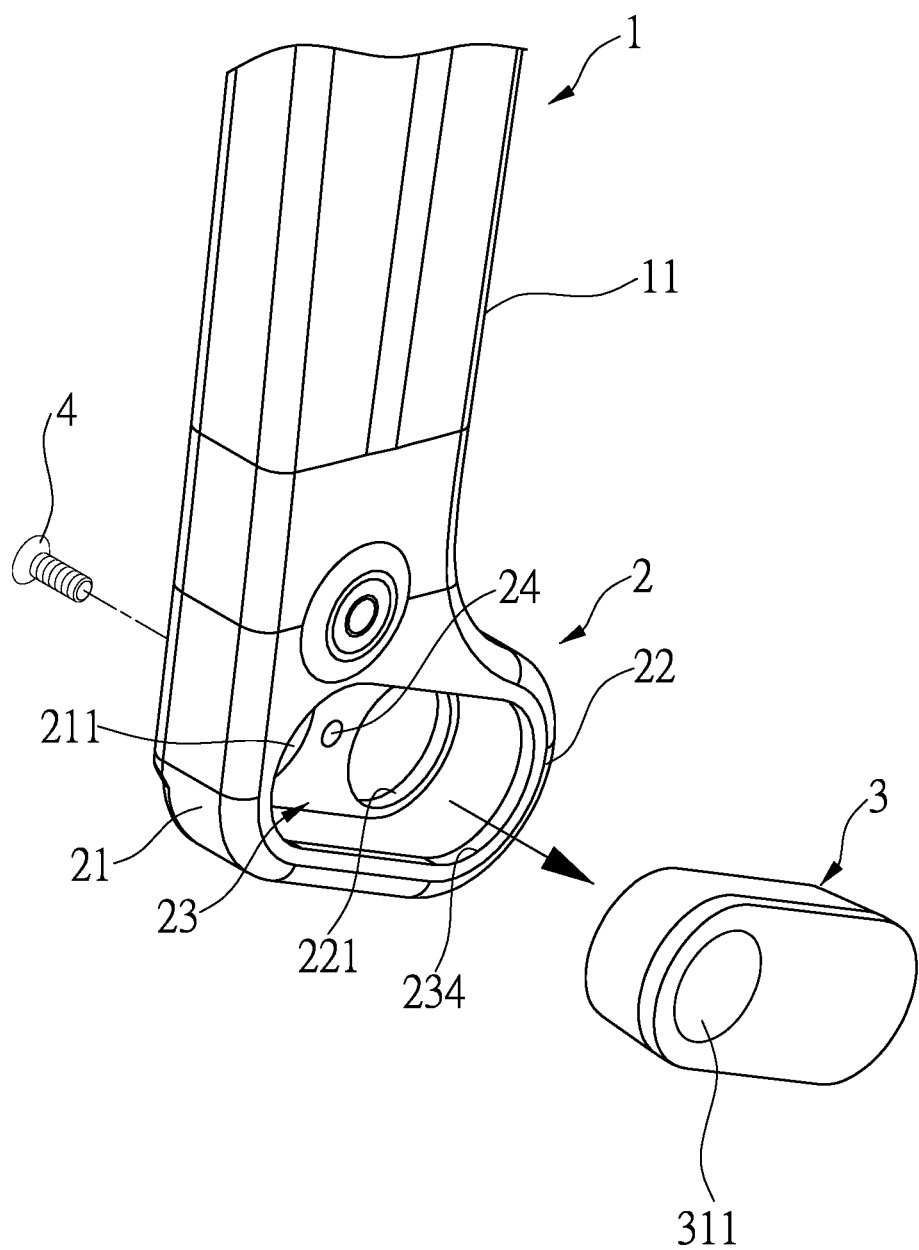
FIG. 7 shows that the adjustment member is removed from the room of the dropout of the front fork.
Figure 8:
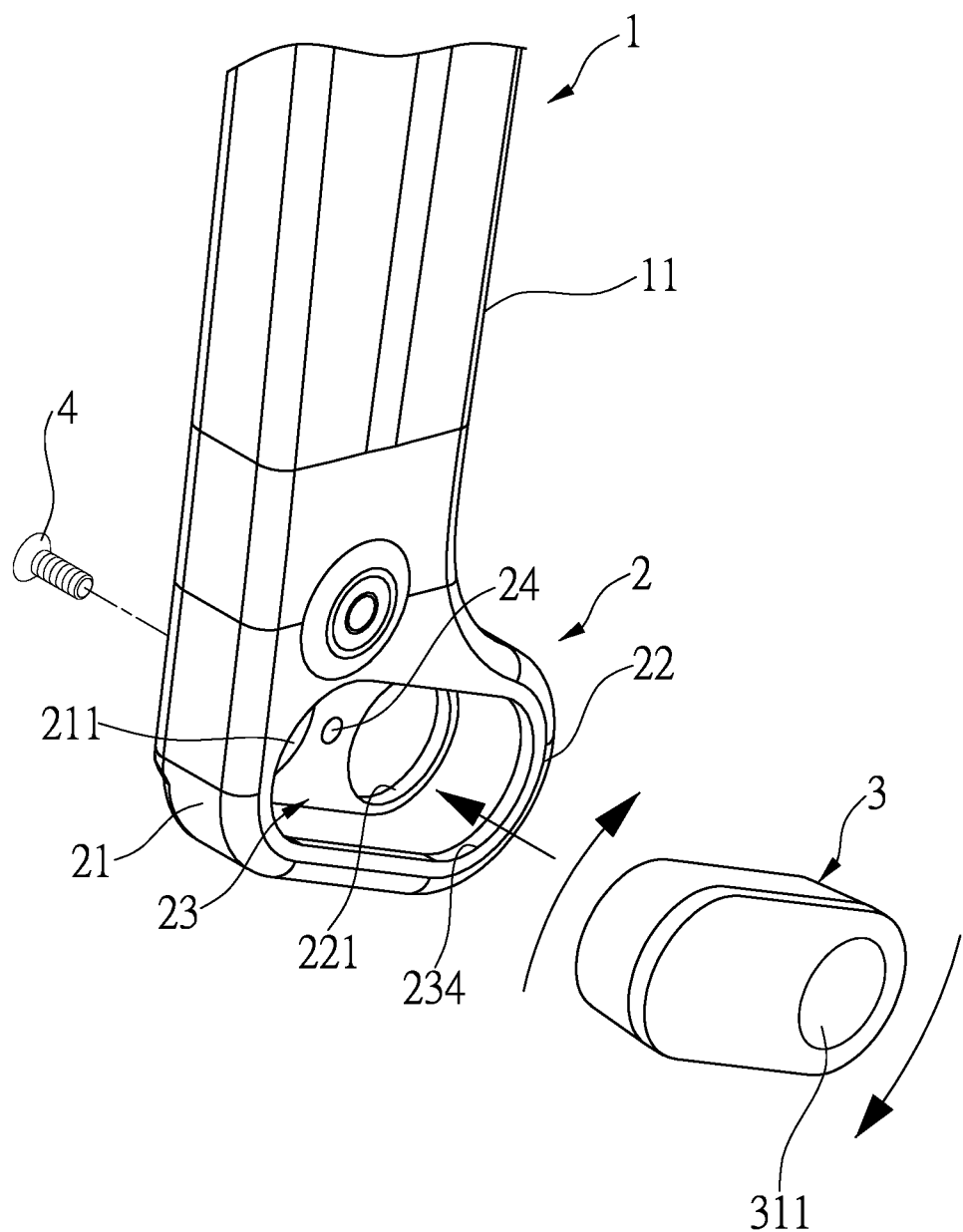
FIG. 8 shows that the adjustment member is rotated and to be put in the room of the dropout of the front fork.
Figure 11:
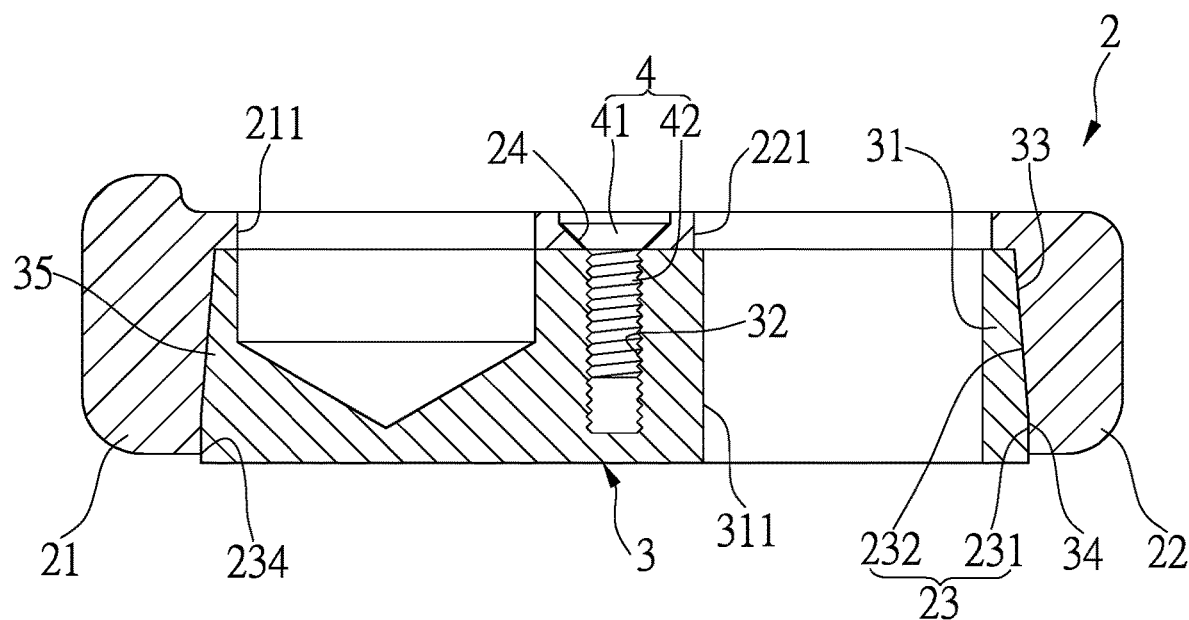
FIG. 11 is a cross sectional view, taken along line X-X in FIG. 9.
Figure 12:
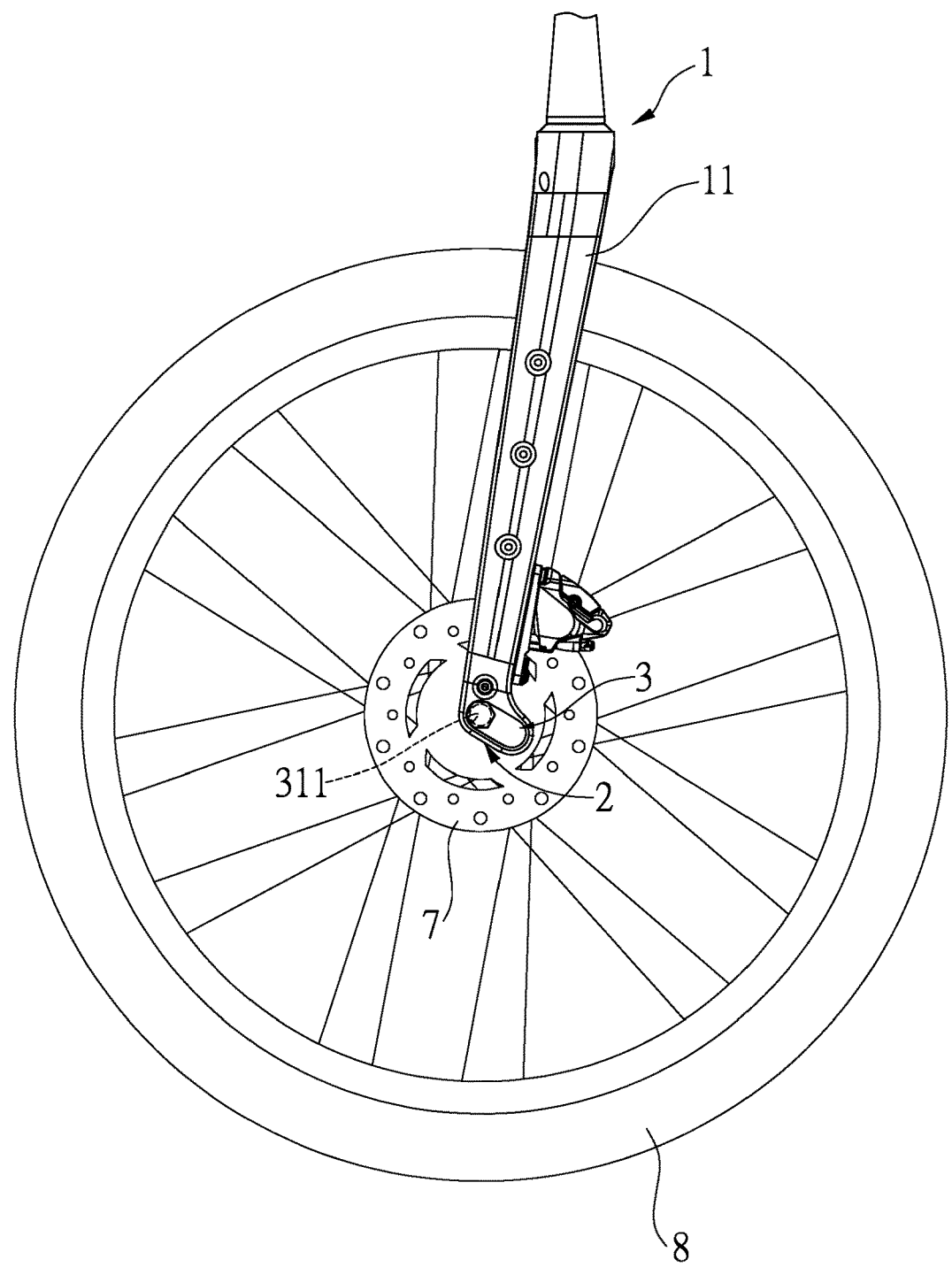
FIG. 12 shows that the wheel is equipped with another brake disk and is installed to the front fork, wherein the adjustment member located at the first position.
Figure 13:
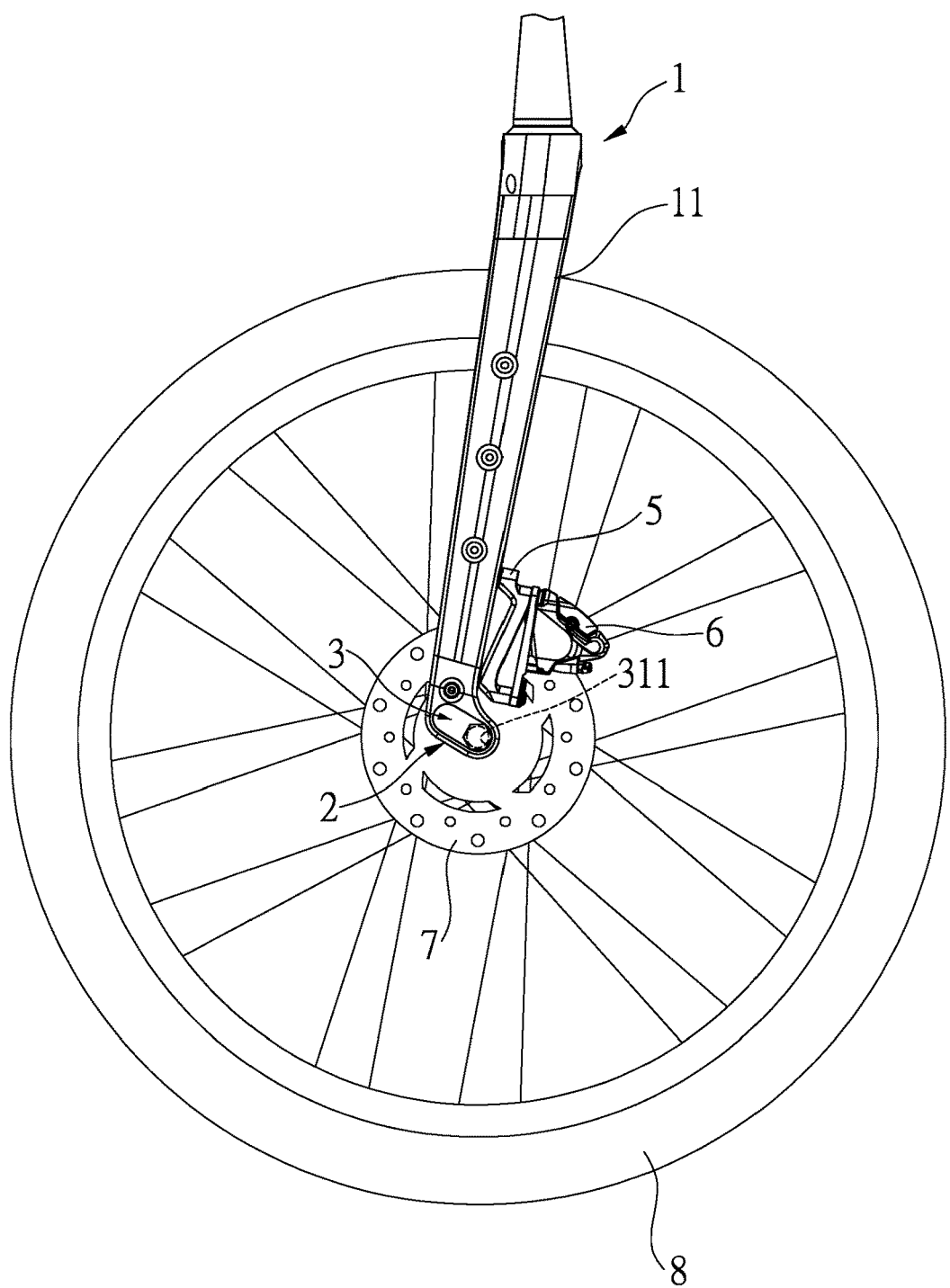
FIG. 13 shows that the adjustment member located at the second position of the front fork as disclosed in FIG. 12.

As shown in FIGS. 5, 6 and 12, when adjusting the front fork offset, from the first position to the second position, the front wheel 8 is removed from the front fork 1 first, and the adjustment member 3 is removed from the room 23. The adjustment member 3 is then rotated 180 degrees, and the adjustment member 3 is put into the room 23 again with the second hole 221 is located corresponding to the passage 311. The front wheel 8 is installed to the front fork 1 as shown in FIGS. 9 to 13 to engage the axle of the hub of the front wheel 8 with the passage 311 and the second hole 221.

Specifically, the adjustment member 3 is an elongate member, and the room 23 is an elongate room so as to accommodate the adjustment member 3. The elongate adjustment member 3 and the elongate room 23 ensure that the adjustment member 3 not to shake. The adjustment member 3 includes a connection portion 31 and a sealed portion 35, wherein the passage 311 is located at the connection portion 31. When the adjustment member 3 is located at the first position, the sealed portion 35 seals the second hole 221 of the dropout 2 corresponding thereto. When the adjustment member 3 is located at the second position, the sealed portion 35 seals the first hole 211 of the dropout 2 corresponding thereto. This arrangement ensures that the users install the axle of the hub of the front wheel 8 with the passage 311 and the desired first hole 211 or the second hole 221. In addition, dust can be prevented from entering the hub.

As shown in FIGS. 2, 3, 5 and 11, each dropout 2 includes a bore 24 which is located between the first and second holes 211, 221. The adjustment member 3 includes a reception hole 32 facing the room 23 of the dropout 2 corresponding thereto. A securing member 4 includes a head 41 and a shank 42. The shank 42 extends through the bore 24 and is threadedly connected to the reception hole 32. The head 41 contacts the inside of the dropout 2. Preferably, the head 41 is in flush with the inside of the dropout 2.

As shown in FIGS. 6 and 11, the inner periphery of each room 23 includes a straight portion 231 and a tapered portion 232 when viewed from laterally. The straight portion 231 is located away from the inner bottom of the room 23. The tapered portion 232 is located away from the opening 234 of the room 23. The adjustment member 3 is shaped to be engaged with the room 23. The outer periphery of the adjustment member 3 includes a tapered face 33 and a straight face 34. When the adjustment member 3 is located in the room 23, the tapered face 33 of the adjustment member 3 is matched with the tapered portion 232 of the room 23, and the straight face 34 of the adjustment member 3 is matched with the straight portion 231 of the room 23. The engagement between the tapered portion 232 and the tapered face 33 makes the adjustment member 3 be easily engaged with the room 23.

Figure 9:
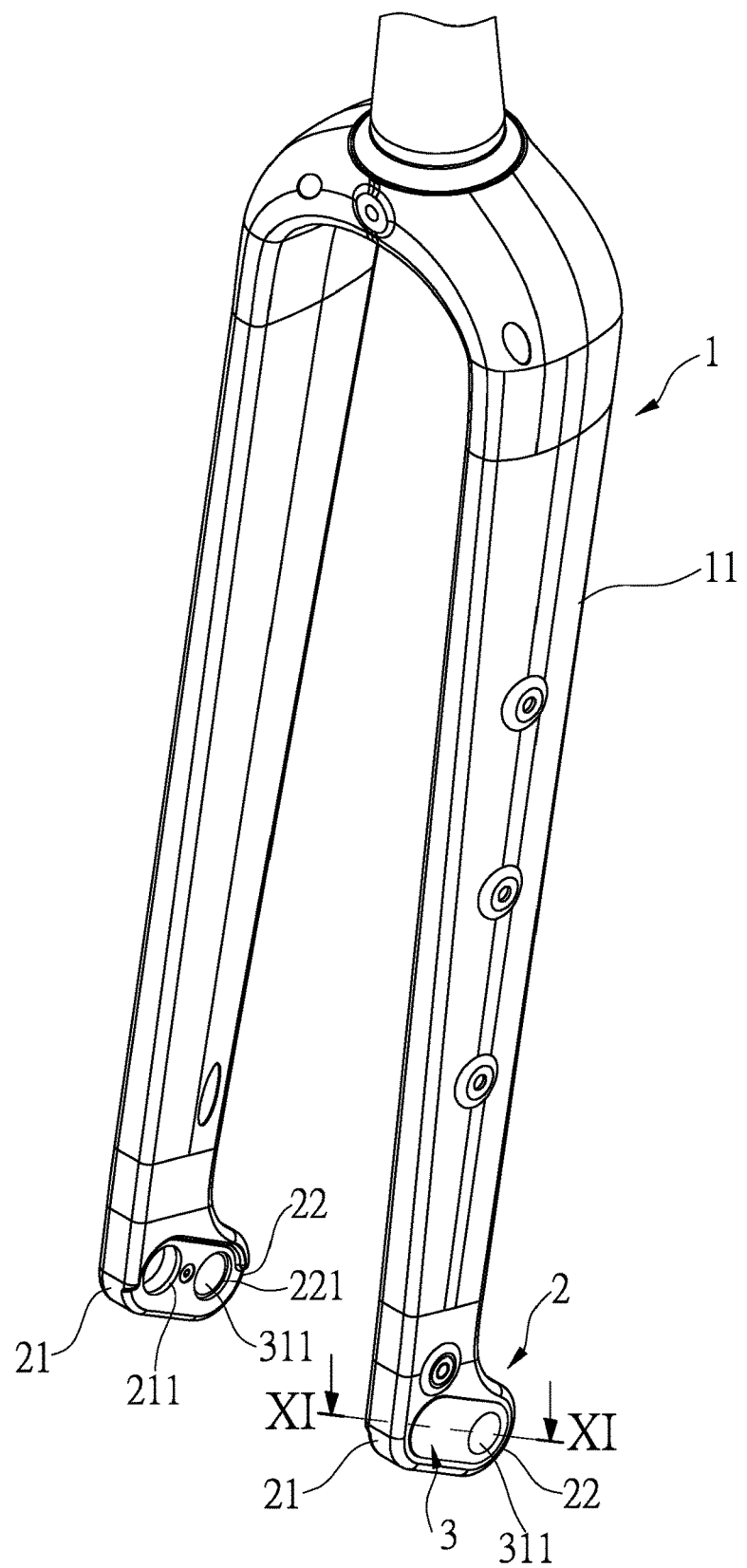
FIG. 9 shows that the adjustment member is located at the second position in the room of the dropout.
Figure 10:
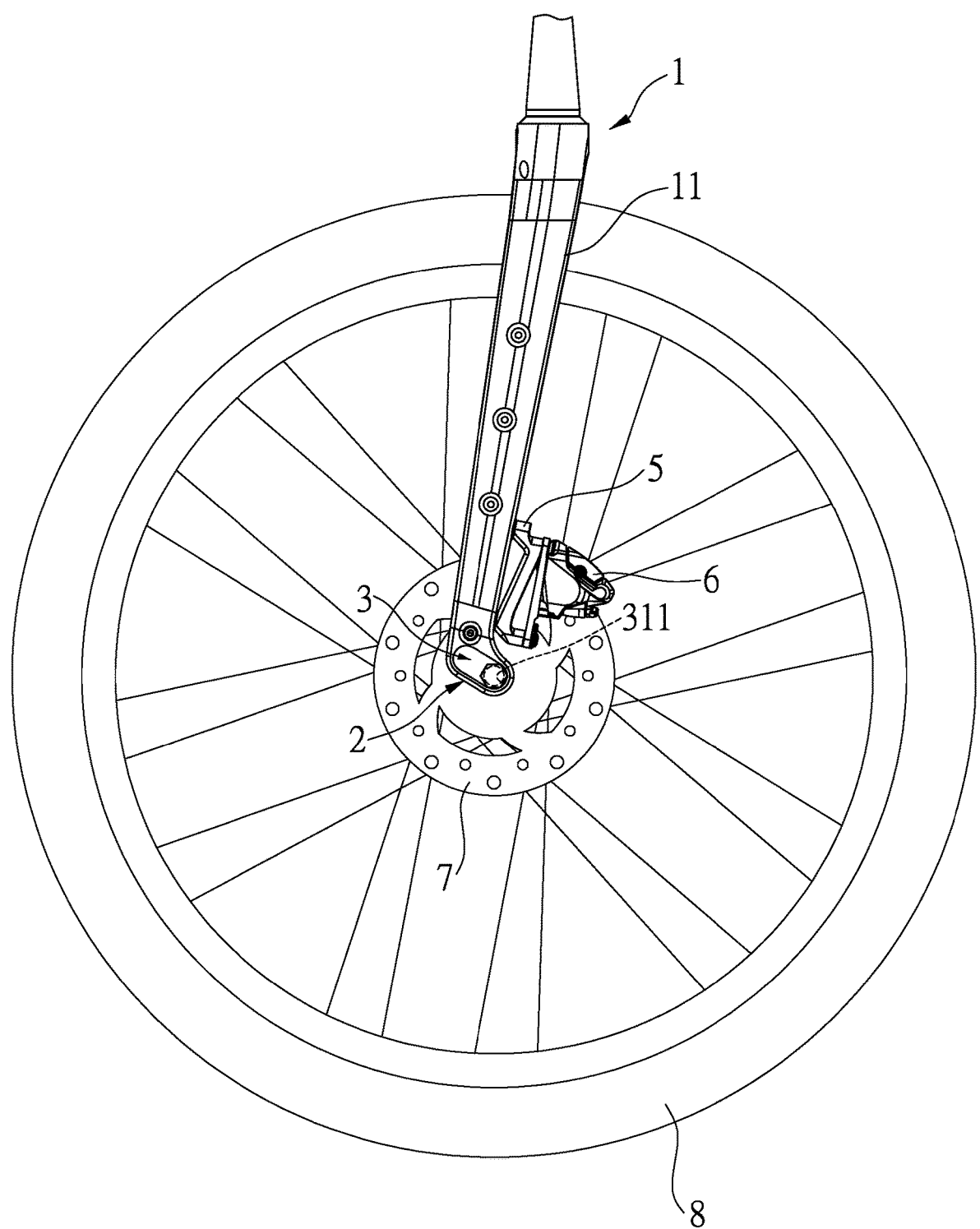
FIG. 10 shows that the adjustment member located at the second position in the room of the dropout, and the wheel is installed to the front fork.

As shown in FIGS. 5 and 9, each of the legs 11 includes a brake mount 5 movably connected thereto. The brake mount 5 extends in a common direction as the second portion 22 extends. The brake mount 5 is adjusted relative to the leg 11 after the fork offset is changed, such that the brake part 6 can be re-positioned to properly clamp the brake disk 7.

While we have shown and described the embodiment in accordance with the present invention, it should be clear to those skilled in the art that further embodiments may be made without departing from the scope of the present invention.

What is claimed is:

1. A bicycle front fork adjustment device comprising:
a front fork including a crown portion and two legs extending from the crown portion, each leg including a dropout which includes a first portion and a second portion, the second portion extending from the first portion in a direction away from the first portion, a room formed in an outside of each of the dropouts and located corresponding to the first and second portions, a first hole defined through an inner bottom of the room and located corresponding to the first portion, a second hole defined through the inner bottom of the room and located corresponding to the second portion, the room forming an opening which is located away from the inner bottom of the room, and an adjustment member adjustably located in the room of each leg, the adjustment member having a passage defined therethrough, the adjustment member being located at a first position in the room when the passage is located corresponding to the first hole, the adjustment member being located at a second position in the room when the passage is located corresponding to the second hole.

2. The bicycle front fork adjustment device as claimed in claim 1, wherein the adjustment member is an elongate member, the room is an elongate room so as to accommodate the adjustment member.

3. The bicycle front fork adjustment device as claimed in claim 1, wherein the adjustment member includes a connection portion and a sealed portion, the passage is located at the connection portion, when the adjustment member is located at the first position, the sealed portion seals the second hole of the dropout corresponding thereto, when the adjustment member is located at the second position, the sealed portion seals the first hole of the dropout corresponding thereto.

4. The bicycle front fork adjustment device as claimed in claim 1, wherein each dropout includes a bore which is located between the first and second holes, the adjustment member includes a reception hole facing the room of the dropout corresponding thereto, a securing member includes a head and a shank, the shank extends through the bore and is connected to the reception hole, the head contacts an inside of the dropout.

5. The bicycle front fork adjustment device as claimed in claim 1, wherein an inner periphery of each room includes a straight portion and a tapered portion, the straight portion is located away from the inner bottom of the room, the tapered portion is located away from the opening of the room, the adjustment member is shaped to be engaged with the room, an outer periphery of the adjustment member includes a tapered face and a straight face, when the adjustment member is located in the room, the tapered face of the adjustment member is matched with the tapered portion of the room, and the straight face of the adjustment member is matched with the straight portion of the room.

6. The bicycle front fork adjustment device as claimed in claim 1, wherein each of the legs includes a brake mount movably connected thereto, the brake mount extends in a common direction as the second portion extends.

* * * * *